US012745698B2

(12) United States Patent
Gerk et al.

(10) Patent No.: US 12,745,698 B2
(45) Date of Patent: Sep. 29, 2026

(54) SELF-DRIVING WORK APPARATUS

(71) Applicant: Andreas Stihl AG & Co. KG, Waiblingen (DE)

(72) Inventors: Nikolai Gerk, Grafenau (DE); Martin Ullrich, Fellbach (DE); Martin Failenschmid, Engstingen (DE); Christian Schmidt, Schwaikheim (DE); Sven Keller, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 686 days.

(21) Appl. No.: 18/175,385

(22) Filed: Feb. 27, 2023

(65) Prior Publication Data

US 2023/0270045 A1 Aug. 31, 2023

(30) Foreign Application Priority Data

Feb. 28, 2022 (EP) .................................... 22159218

(51) Int. Cl.

| | |
|---|---|
| ***F16C 11/06*** | (2006.01) |
| ***A01D 34/00*** | (2006.01) |
| ***A01D 34/81*** | (2006.01) |

(52) U.S. Cl.

CPC ........... *A01D 34/008* (2013.01); *A01D 34/81* (2013.01); *F16C 11/06* (2013.01)

(58) Field of Classification Search

CPC ........ A01D 34/008; A01D 34/81; F16C 11/06

See application file for complete search history.

(56) References Cited

FOREIGN PATENT DOCUMENTS

| | | | |
|---|---|---|---|
| EP | 3 470 311 | A1 | 4/2019 |
| WO | 2018/174774 | A1 | 9/2018 |
| WO | 2018/174777 | A1 | 9/2018 |

*Primary Examiner* — Claude J Brown

(74) *Attorney, Agent, or Firm* — Walter Ottesen, P.A.

(57) ABSTRACT

A self-driving work apparatus has a chassis, at least one tool and a hood. The hood is movably mounted on the chassis via at least one bearing. The bearing allows a movement of the hood relative to the chassis in a vertical direction in the park position and in a horizontal direction. The bearing has a support which is pivotably connected to the hood and has a first support surface which rests on a second support surface of the chassis. A reference axis of the support pivots about a pivot angle when the support pivots from a rest position into a maximally tilted position. At least one of the support surfaces is formed convex such that the first support surface rolls on the second support surface at least in a partial angular region when the first support surface pivots about a horizontal pivot axis.

16 Claims, 3 Drawing Sheets

SELF-DRIVING WORK APPARATUS

CROSS-REFERENCE TO RELATED APPLICATIONS

This application claims priority of European patent application no. 22 159 218.1, filed Feb. 28, 2022, the entire content of which is incorporated herein by reference.

TECHNICAL FIELD

The disclosure is directed to a self-driving work apparatus having at least one tool and having a park position whereat the work apparatus stand on a flat horizontal surface.

BACKGROUND

WO 2018/174777A1 discloses a self-driving work apparatus which has lift detection and collision detection. For this, a hood of the work apparatus is mounted movably relative to the chassis in the horizontal and vertical directions via several bearings. Each bearing has an elongate support part which lies via the plate in a receiving pot of the chassis. On a relative movement between the hood and chassis in the horizontal direction, this support part tilts, whereby the plate remains resting on the receiving pot only by its peripheral edge.

In the known configuration, the central position is very stable so that comparatively large forces must be overcome before a first deflection of the bearing on a movement of the hood relative to the chassis in the horizontal direction. As soon as the plate rests on its peripheral edge, the bearing is in a sensitive attitude, so even small forces cause comparatively large deflections.

SUMMARY

An object of the disclosure is to provide a self-driving work apparatus which allows a more favorable force development on deflection of the hood in the horizontal direction.

This object is achieved by a self-driving work apparatus having at least one tool and having a park position whereat the work apparatus stands on a flat horizontal surface. The self-driving work apparatus includes: a chassis; at least one bearing; a hood moveably mounted on the chassis via the at least one bearing; the at least one bearing being configured to allow a movement of the hood relative to the chassis in a vertical direction in the park position and in at least one horizontal direction in the park position; the at least one bearing having a support pivotally connected to the hood and the support defining a reference axis; the chassis defining a second support surface; the support defining a first support surface resting on the second support surface so as to permit the reference axis of the support to pivot about a pivot angle ($\alpha$) when the support pivots from a rest position into a maximally tilted position; and, at least one of the first and second support surfaces being formed convex so as to allow the other one of the first and second surfaces to roll on the one surface at least in a partial angular range ($\beta$) when the first support surface pivots about a horizontal pivot axis.

According to the disclosure, it is provided that at least one of the support surfaces is formed convex such that the first support surface rolls on the second support surface at least in a partial angular region when the first support surface pivots about a horizontal pivot axis. In the partial angular region, the support part is in a sensitive attitude, so pivoting can be achieved with comparatively low forces.

Because the first support surface rolls on the second support surface in at least one partial angular region, the sensitive attitude of the support is reached even on a slight deflection.

A simple configuration is achieved if the first support surface is formed convex in at least one portion and the second support surface is formed flat. A complex form of the second support surface and a flat form of the first support surface may however also be advantageous. It may also be advantageous if both support surfaces are formed convex.

Because the first support surface rolls on the second support surface in at least a partial angular region, the roll center—and hence the lever arm with which return forces act—changes. The return forces may for example result from its own weight and/or elastic elements which act on the support. A suitable convex configuration of at least one of the support surfaces, with otherwise unchanged bearing configuration, may achieve an adaptation of the characteristic curve of the return force. In a simple fashion, a progressive curve of the spring force can be achieved without the need for changes to the spring or a special spring configuration. Suitable adaptation of the support surfaces also allows other characteristic curves to be set, for example progressive curves, degressive curves or graduated, that is, stepped curves.

In an embodiment, the support is preloaded into the rest position by at least one elastic element. The elastic element is in particular a coil spring. A particularly advantageous embodiment can result if the elastic element is a conical coil spring. This allows a favorable arrangement.

The partial angular region advantageously amounts to at least 20% of the pivot angle. Particularly preferably, the partial angular region amounts to at least 50%, in particular at least 80% of the pivot angle of the support between the rest position and the maximally tilted position. The pivot angle is measured in a section plane through a longitudinal center axis of the bearing, between the central position and the maximally tilted position. The section plane is selected such that the longitudinal center axis lies in the section plane both in the central position and in the maximally tilted position.

The lever arm with which the elastic element exerts a torque on the support in the direction of the rest position changes continuously in the region in which a rolling movement of the support surfaces takes place. With the same return force, the torque which the elastic element exerts on the support in the direction towards the rest position therefore changes. The changing lever arm allows a progressive characteristic curve of the force on the hood which is required for deflection, without a special configuration of the elastic element. Because of the progressive characteristic curve, the deflection and return of the hood are perceived as gentler and more pleasant. Even comparatively small forces acting on the hood may achieve a deflection of the hood and thereby allow detection of a collision. Because of the progressive characteristic curve, a further deflection is only possible with increased force.

A simple configuration results if the first support surface is formed on a plate of the support. Advantageously, the support is arranged in a receiving pot of the bearing. A simple and compact configuration results in particular if the elastic element rests on the receiving pot and on the plate of the support. Another arrangement of the elastic element, and/or another arrangement of the support and support surfaces, may however also be advantageous.

The end position of the support is advantageously defined by a stop. In a particularly advantageous configuration, the stop is formed by a peripheral edge of an opening of the receiving pot. Advantageously, the support protrudes through the opening to the fixing point of the hood. Another configuration may however also be advantageous.

In order to prevent a deterioration in function due to soiling or similar, it is advantageously provided that the support surfaces are arranged in an interior which is sealed against the environment. Advantageously, the seal is achieved via at least one elastic sealing element. In a particularly advantageous configuration, the elastic sealing element is a bellows which seals an interior, containing the plate of the support, against the environment.

Advantageously, the bearing allows a movement of the hood relative to the chassis in a vertical direction in the park position. The parts which allow the movement of the hood relative to the chassis in the vertical direction in the park position are also advantageously sealed from the environment, and preferably arranged in the interior of the bellows. The movement of the hood relative to the chassis in a vertical direction in the park position is used in particular to detect a lifting of the self-driving work apparatus at the hood.

Preferably, the movement of the hood relative to the chassis in a vertical direction in the park position is made possible by the support. The support advantageously includes a linear guide. In comparison with the telescopic arrangements known in the prior art, a linear guide has the advantage that the guide length is the same for every position of the support. In this way, a stable guidance of the hood relative to the chassis is achieved and a tilting of the elements relative to one another is prevented. The linear guide is advantageously formed by a guide element and a bearing element guided movably relative to the guide element. In a configuration, the first support surface is connected to the guide element. In a particular configuration, the first support surface is formed on the guide element. The bearing element may advantageously protrude through the guide element so that a long guide length is possible with a compact arrangement. The bearing element may protrude through the region of the guide element which contains the at least one first support surface.

Advantageously, stops are provided for the end positions of the bearing element relative to the guide element. Advantageously, a first stop is provided on the guide element. It may be provided that also the second stop is formed on the guide element. In a particularly preferred configuration, the second stop is formed on the chassis. The second stop advantageously defines the upper end position of the hood relative to the chassis. Thus, no fixing of the support part against the chassis, upward in the vertical direction in the park position, is required.

The bearing element is advantageously rod-like. Advantageously, at its end region lying at the bottom in the park position, the bearing element has at least one weight body which, when the support is not in its rest position, exerts a force in the direction towards the rest position.

In order to achieve defined forces and defined positions of the elements relative to one another, it is advantageously provided that the bearing element and the guide element are form-stable. The bearing element and the guide element advantageously consist of form-stable plastic and/or metal.

The bearing element is guided in the guide element over a guide length measured in the direction of its longitudinal axis. The longitudinal axis of the bearing element is the movement axis of the linear guide. The guide length is advantageously the same size for every relative position of bearing element and guide element. The guide length advantageously corresponds to at least twice the smallest diameter of the linear guide. A guide length of at least three times, in particular at least five times the smallest diameter of the linear guide is preferred.

Advantageously, the bearing element extends on the bottom side of the chassis facing the parking surface in the park position. Thus, in simple fashion, a comparatively long length of the bearing element can be achieved and hence a large travel between the end positions of the bearing element. At the same time, the installation space may be comparatively small and the height of the self-driving work apparatus can be kept low.

Advantageously, the bearing element carries a holder for the hood. For this, the bearing element may for example include a ball head on which the holder is held.

To ensure good detection of collisions and lifting of the hood, and at the same time allow a stable position of the hood, it is provided that several, in particular at least three bearings are provided. In a particularly preferred configuration, all bearings have the same construction. A different configuration of the bearings may however also be provided.

BRIEF DESCRIPTION OF DRAWINGS

The invention will now be described with reference to the drawings wherein.

DETAILED DESCRIPTION

Figure 1:
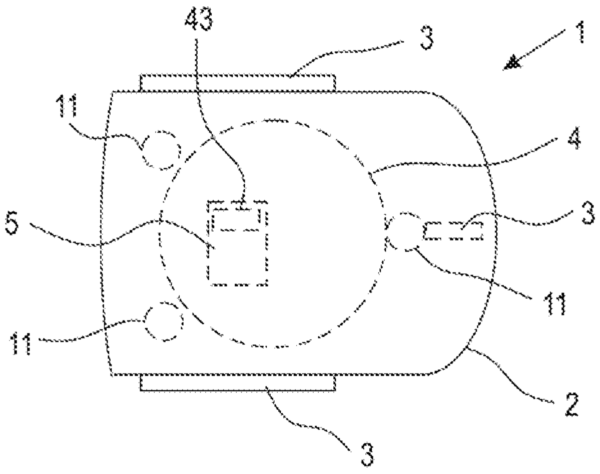
FIG. 1 shows a schematic top view of a self-driving work apparatus.

FIG. 1 shows schematically a self-driving work apparatus 1. In the embodiment, the self-driving work apparatus is a lawn mower 1, namely a self-driving lawn mower. The lawn mower 1 has a chassis 6 which can drive over the ground on wheels 3. In the embodiment, two rear side wheels 3 and a front central wheel 3 are provided. The rear wheels 3 are arranged at the side of the chassis and are comparatively large. The front central wheel 3 is comparatively small and is arranged below the chassis 6 in this embodiment. A different arrangement and number of wheels 3 may also be provided.

Figure 2:
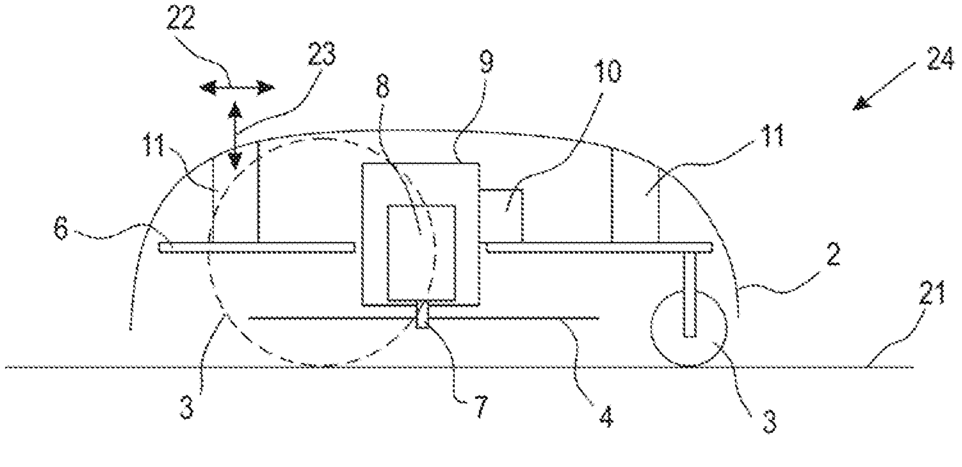
FIG. 2 shows a schematic section view through the work apparatus in FIG. 1.

A drive motor 8 is arranged on the chassis 6. In this embodiment, the drive motor 8 is held in a motor receptacle 9. The motor receptacle 9 is arranged adjustably relative to the chassis 6 via a height adjustment device 10. The drive motor 8 has a drive shaft 7 on which a blade 4 is fixed. By changing the position of the motor receptacle 9 with drive motor 8, the height of the blade 4 relative to a parking surface 21 may be adjusted. FIG. 2 shows the lawn mower 1 in a park position 24 in which the lawn mower 1 stands on a flat horizontal parking surface 21. In the park position 24, the height adjustment device 10 allows an adjustment of the position of the blade 4 in a vertical direction 23.

A hood 2 is mounted on the chassis 6. In the embodiment, the hood 2 is held on the chassis 6 via three bearings 11, as FIG. 1 shows. A different arrangement and number of bearings 11 may also be advantageous. The bearings 11 allow a relative movement of the hood 2 in the vertical direction 23 and in a horizontal direction 22. The directions 22 and 23 relate to the park position 24 shown in FIG. 2, on a flat horizontal parking surface 21.

The lawn mower 1 has a controller 5, as illustrated schematically in FIG. 1. The controller 5 controls the movement of the lawn mower 1 over the ground, and the drive of the blade 4. The controller 5 advantageously has a sensor unit 43. In the embodiment, the sensor unit 43 detects a lifting of the hood 2 and a collision of the hood 2 with an obstacle. If the hood 2 is lifted relative to the chassis 6, the hood 2 executes a movement relative to the chassis 6 in the vertical direction 23. This relative movement is made possible by the bearings 11. If the hood 2 hits an obstacle, the hood 2 executes a movement relative to the chassis in the horizontal direction 22. This relative movement is also made possible by the bearings 11. Both relative movements are advantageously detected by the sensor unit 43, which may include one or more sensors, and are evaluated for actuation of the lawn mower 1.

Figure 3:
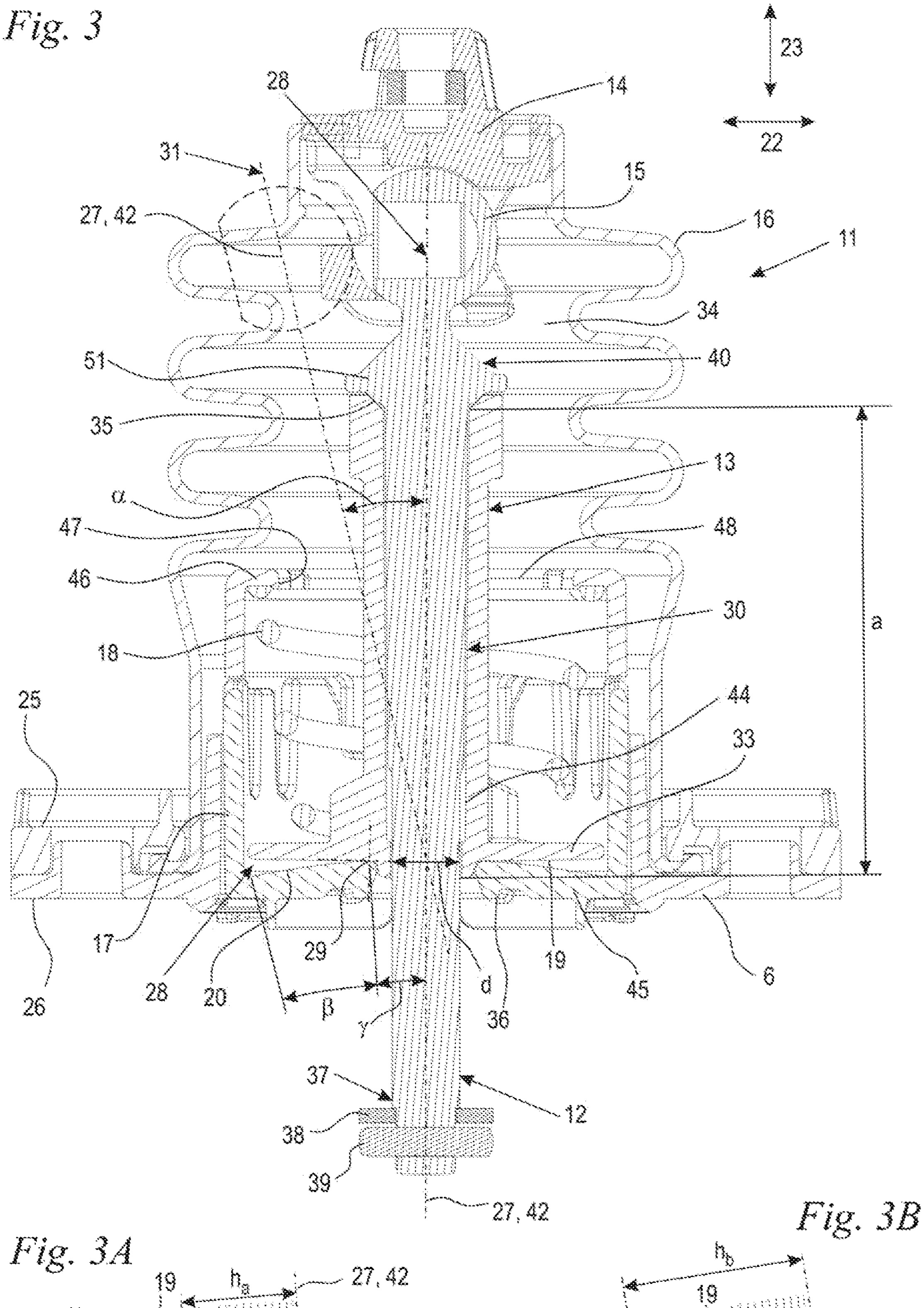
FIG. 3 shows a section view through a bearing of the work apparatus from FIG. 1.

FIG. 3 shows a bearing 11 in enlarged sectional schematic. The bearing 11 includes a receiving pot 17 in which a support 32 is arranged with limited movement. The support 32 carries a holder 14 for the hood 2. In the embodiment, the holder 14 is held on a bearing head 15 of the support 32. A sealing element 16, in this embodiment a bellows, extends between a top side 25 of the chassis 6 and the holder 14. The sealing element 16 seals an interior 34, containing the moving parts of the bearing 11, against the environment. Thus the parts of the bearing 11 which are movable relative to one another are protected from environmental influences, in particular soiling.

The support 32 includes a bearing element 12 and a guide element 13. The bearing element 12 is formed rod-like. In the embodiment, the bearing element 12 protrudes through a central opening 44 of the guide element 13. A linear guide 30 is formed between the bearing element 12 and the guide element 13. The bearing element 12 has a longitudinal axis 42. The linear guide 30 allows a movement of the bearing element 12 relative to the guide element 13 in the direction of the longitudinal axis 42. In FIG. 3, the bearing element is arranged in a first end position 40 relative to the guide element 13. The first end position 40 is defined by a first stop 35 on the guide element 13. In this embodiment, the first stop 35 is formed on a chamfer surrounding the opening 44. In the first end position 40, the bearing element 12 rests with a thickening 51 on the first stop 35. A different arrangement and/or configuration of the first stop 35 may however be advantageous.

In the rest position illustrated in FIG. 3, in which the support 32 is in its rest position 28 and the bearing element 12 is in a first end position 40 relative to the guide element 13, the longitudinal axis 42 is advantageously oriented in the vertical direction 23. The linear guide 30 allows a movement of the hood 2 relative to the chassis 6 in the vertical direction 23. In this embodiment, the guide element 13 is formed approximately tubular, wherein a widened plate 33 is formed at one end of the guide element 13. A different arrangement of the plate 33 may also be provided.

The guide element 13 is mounted pivotably in the receiving pot 17. The receiving pot 17 has a base 45 which forms a supporting surface 20 on its side lying on the top in the park position 24 (FIG. 1). The support surface 20 is a second support surface, which cooperates with a first support surface 19 on the guide element 13 when the support 32 pivots relative to the receiving pot 17. In this embodiment, the guide element 13 includes the plate 33, the underside of which forms the first support surface 19. When the support 32 pivots relative to the receiving pot 17, the first support surface 19 rolls on the second support surface 20 in a partial angular region β. In order to achieve this rolling movement, the second support surface 20 is formed convex. A convex configuration of the first support surface 19 or a convex configuration of both support surfaces 19, 20 is also possible.

FIG. 3 shows in a dotted line the position of the longitudinal axis 42 in a maximally tilted position 31 of the support 32. In this position 31, the support 32 rests on a stop. In the embodiment, the stop is formed by the inner side 47 of a rim or edge 46 of the receiving pot 17. The edge 46 surrounds an opening 48 in the receiving pot, through which the support 32 protrudes in the direction towards the holder 14. A reference axis 27 of the support 32 pivots about a pivot angle α between the rest position 28 and the side end position 31. In the embodiment, the reference axis 27 is the longitudinal axis 42 of the bearing element 12. However, another reference axis 27 may also be selected. The reference axis 27 lies perpendicular to the pivot axis of the support 32. The partial angular region β of the pivoting, in which the two support surfaces 19 and 20 roll on one another, advantageously amounts to at least 20% of the entire pivot angle α of the support 32. The partial angular region β advantageously amounts to at least 4°.

When the support 32 pivots from the rest position 28 in the direction towards the maximally tilted position 31, firstly a partial angular region γ is covered until the support 32 pivots about a pivot axis 29 so as to exceed this. In the partial angular region γ, the support surfaces 19 and 20 do not roll on one another. The roll center is stationary in the partial angular region γ. On further pivoting, the support surfaces 19 and 20 come into contact with one another and roll on one another. Thus the position of the pivot axis, that is, the center of rotation of the rolling movement, continuously changes. This gives a change in the roll center over the entire partial angular region β.

Figure 3A:
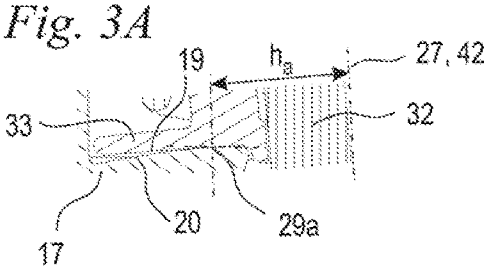
FIGS. 3A and 3B show in extract schematics the bearing from FIG. 3 in different tilt positions of the support; and, FIG. 4 shows a section view through the bearing in the upper end position of the bearing element relative to the guide element.
Figure 3B:
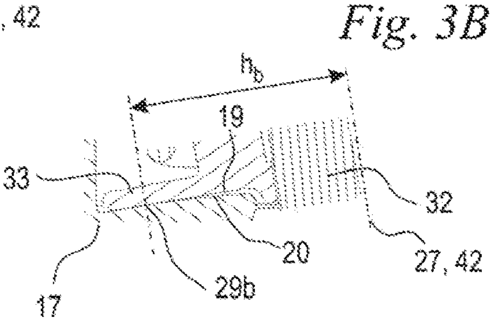

FIG. 3A shows the position of the support 32 for a pivot axis 29*a*, and FIG. 3B the position of the support 32 for a pivot axis 29*b*. The pivot axis 29*a* (FIG. 3A) has a distance $h_a$ from the longitudinal axis 42. The pivot axis 29*b* (FIG. 3B) has a distance $h_b$ from the longitudinal axis 42 which is significantly greater than the distance $h_a$. The distance $h_a$, $h_b$ determines the lever arm with which the return forces act on the support 32 and exert a return moment in the direction towards the rest position 28. The position of the pivot axes 29, 29*a*, 29*b* thus determines the return forces acting on the support 32.

In the embodiment, an elastic element 18 is provided which preloads the support 32 in the direction towards its rest position 28. In this embodiment, the elastic element 18 is a spring, namely a coil spring. Other elastic elements, or a combination of several elastic elements, may however also be provided. The coil spring forming the elastic element 18 is a conical spring in this embodiment. The end of the spring with the larger outer diameter lies against the inner side of the edge 46 of the receiving pot 17, and the end with the smaller outer diameter lies on the top side of the plate 33. The elastic element 18 exerts a return force on the support 32 in the direction towards the rest position 28. The force which the elastic element 18 exerts is constant because of the constant spring characteristic of the elastic element 18. The moment is therefore dependent on the lever arm ha, hb, that is, on the distance of the pivot axis 29, 29*a*, 29*b* from the position of the longitudinal axis 42 in the rest position 28. This lever arm increases as the pivot angle enlarges, so that the return moment increases. On small deflections therefore, the return force is comparatively small, but increases as the deflection from the rest position 28 increases.

As FIG. 3 shows, the receiving pot 17 substantially extends on the top side 25 of the chassis 6. In its first end position 40, the bearing element 12 extends down to a bottom side 26 of the chassis 6. The top side 25 is the side at the top in the park position 24, and the bottom side 26 is the underside of the chassis 6 in the park position 24. The bearing element 12 protrudes through a pass-through opening 49 on the bottom side 26 of the chassis 6. Because the bearing element 12 protrudes on the bottom side 26, a large relative movement in the vertical direction 23 can be achieved with a small structure. The bearing element 12 has weight bodies on its downwardly protruding end region 37. In the embodiment, a first weight body 38 is provided in the form of a disc, which is held by a second weight body 39 in the form of a pin protruding through the bearing element 12. The weight bodies 38 and 39 also cause a return of the support 32 in the direction towards the rest position 28 when the support 32 is not in its rest position 28.

The linear guide 30 has a guide length a. The guide length a corresponds to the distance between the top and bottom regions of the bearing element 12 which is guided in the guide element 13. If the bearing element 12 moves relative to the guide element 13, the guide length a does not change. In the first end position 40, a thickening 51 (FIGS. 3 and 4) of the bearing element 12 lies on a first stop 35 of the guide element 13, and thus limits the downward movement of the bearing element 12 in the park position 24.

Figure 4:
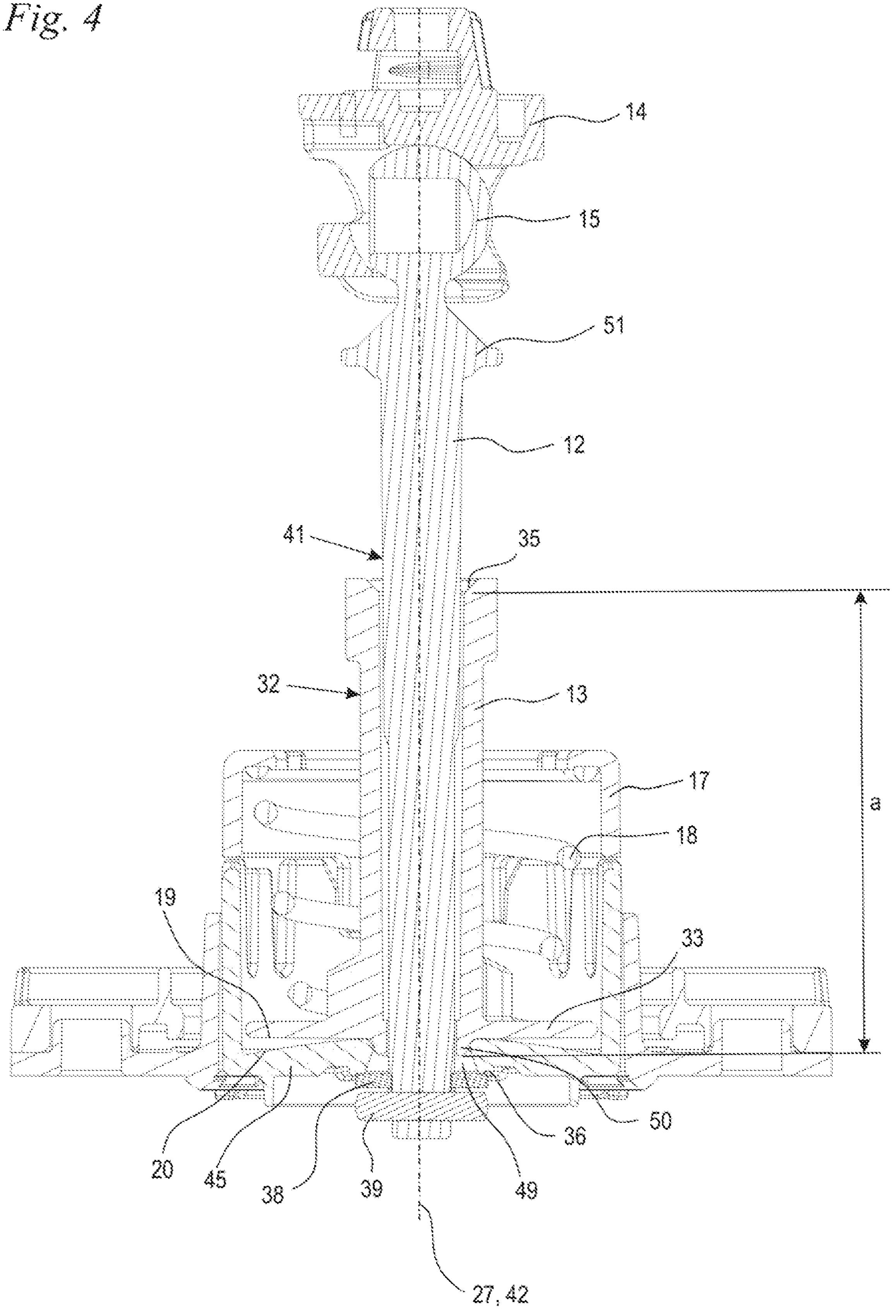

FIG. 4 shows the bearing element 12 in a second end position 41. In FIG. 4, the sealing element 16 is not shown for greater clarity. In the second end position 41 shown in FIG. 4, the weight body 38 bears on a second stop 36 of the chassis 6. In this embodiment, the second stop 36 is formed on the bottom side of the receiving pot 17 of the chassis. The stop 36 surrounds the pass-through opening 49 on the base 45 of the receiving pot 17. From the opposite side, a projection 50 of the guide element 13 protrudes into the pass-through opening 49 and thereby centers the guide element 13 in the receiving pot 17. The projection 50 is annular and surrounds the bearing element 12.

Both the linear guide 30 and the pivot mounting, formed by the support surfaces 19 and 20, are arranged in the interior 34 of the sealing element 16 and thereby protected from environmental influences, in particular soiling. As FIG. 4 shows, in the second end position 41 shown here, the guide length a is precisely the same length as the guide length a in the first end position 40 (FIG. 3). The guide length a advantageously corresponds to at least twice the smallest diameter d of the linear guide 30. The diameter d is shown in FIG. 3. In the embodiment, the smallest diameter d lies close to the pass-through opening 49.

It is understood that the foregoing description is that of the preferred embodiments of the invention and that various changes and modifications may be made thereto without departing from the spirit and scope of the invention as defined in the appended claims.

The invention claimed is:

1. A self-driving work apparatus having at least one tool and having a park position whereat the work apparatus stands on a flat horizontal surface, the self-driving work apparatus comprising:

a chassis;

at least one bearing;

a hood moveably mounted on said chassis via said at least one bearing;

said at least one bearing being configured to allow a movement of said hood relative to said chassis in a vertical direction in said park position and in at least one horizontal direction in said park position;

said at least one bearing having a support pivotally connected to said hood and said support defining a reference axis;

said chassis defining a second support surface;

said support defining a first support surface resting on said second support surface so as to permit said reference axis of said support to pivot about a pivot angle (α) when said support pivots from a rest position into a maximally tilted position; and, at least one of said first and second support surfaces being formed convex, wherein said first support surface and said second support surface are configured to allow the other one of said first and second surfaces to roll on said one surface at least in a partial angular range (β) when said first support surface pivots about a horizontal pivot axis.

2. The self-driving work apparatus of claim 1, wherein said first support surface is formed convex in at least one portion and said second support surface is formed flat.

3. The self-driving work apparatus of claim 1, wherein said support is preloaded into said rest position by at least one elastic element.

4. The self-driving work apparatus of claim 3, wherein said partial angular range (β), in which said first support surface rolls on said second support surface when the first support surface pivots about a horizontal pivot axis, amounts to at least 20% of the pivot angle (α).

5. The self-driving work apparatus of claim 1, wherein said first and second support surfaces are arranged in an interior sealed against the ambient.

6. The self-driving work apparatus of claim 1, wherein said self-driving work apparatus is a lawn mower.

7. A self-driving work apparatus having at least one tool and having a park position whereat the work apparatus stands on a flat horizontal surface, the self-driving work apparatus comprising:

a chassis;

at least one bearing;

a hood moveably mounted on said chassis via said at least one bearing;

said at least one bearing being configured to allow a movement of said hood relative to said chassis in a vertical direction in said park position and in at least one horizontal direction in said park position;

said at least one bearing having a support pivotally connected to said hood and said support defining a reference axis:

said chassis defining a second support surface;

said support defining a first support surface resting on said second support surface so as to permit said reference axis of said support to pivot about a pivot angle (α) when said support pivots from a rest position into a maximally tilted position; and, at least one of said first and second support surfaces being formed convex so as to allow the other one of said first and second surfaces to roll on said one surface at least in a partial angular range (β) when said first support surface pivots about a horizontal pivot axis:

said support being preloaded into said rest position by at least one elastic element;

wherein said first support surface is formed on a plate of said support, and said support is arranged in a receiving pot of said at least one bearing; and, wherein said elastic element rests on the receiving pot and on said plate of said support.

8. A self-driving work apparatus having at least one tool and having a park position whereat the work apparatus stands on a flat horizontal surface, the self-driving work apparatus comprising:

a chassis:

at least one bearing;

a hood moveably mounted on said chassis via said at least one bearing;

said at least one bearing being configured to allow a movement of said hood relative to said chassis in a vertical direction in said park position and in at least one horizontal direction in said park position:

said at least one bearing having a support pivotally connected to said hood and said support defining a reference axis;

said chassis defining a second support surface;

said support defining a first support surface resting on said second support surface so as to permit said reference axis of said support to pivot about a pivot angle (α) when said support pivots from a rest position into a maximally tilted position; and, at least one of said first and second support surfaces being formed convex so as to allow the other one of said first and second surfaces to roll on said one surface at least in a partial angular range (β) when said first support surface pivots about a horizontal pivot axis;

wherein said bearing allows a movement of said hood relative to said chassis in said vertical direction in said park position;

wherein:

said support includes a linear guide defined by a guide element and a bearing element movably guided relative to said guide element and said linear guide is configured to allow relative movement in said vertical direction; and, said first support surface is fixedly connected to said guide element.

9. The self-driving work apparatus of claim 8, wherein a first stop is provided for a first end position of said linear guide, and a second stop for a second end position of said linear guide.

10. The self-driving work apparatus of claim 9, wherein said first stop is formed on said guide element and said second stop is formed on said chassis.

11. The self-driving work apparatus of claim 8, wherein said bearing element has a rod-like configuration and has a lower end region lying at bottom in said park position; and, said bearing element further has at least one weight body on said lower end region which applies a force thereto toward said rest position when said support is not in said rest position.

12. The self-driving work apparatus of claim 8, wherein said bearing element and said guide element are form-stable.

13. The self-driving work apparatus of claim 8, wherein said bearing element defines a longitudinal axis and is guided in said guide element over a guide length (a) measured along said longitudinal axis of said bearing element; and, said guide length (a) has a same magnitude for every relative position of said bearing element and said guide element.

14. The self-driving work apparatus of claim 13, wherein said guide length (a) corresponds to at least twice a smallest diameter (d) of said linear guide.

15. The self-driving work apparatus of claim 8, wherein said bearing element extends on a bottom side of said chassis facing the parking surface in said park position.

16. The self-driving work apparatus of claim 8, wherein said bearing element carries a holder for said hood.

* * * * *